United States Patent
Oprescu-Surcobe et al.

(10) Patent No.: US 8,787,212 B2
(45) Date of Patent: Jul. 22, 2014

(54) METHODS FOR REDUCING SET-UP SIGNALING IN A LONG TERM EVOLUTION SYSTEM

(75) Inventors: Valentin Oprescu-Surcobe, Northbrook, IL (US); Michael F. Korus, Eden Prairie, MN (US); Donald G. Newberg, Hoffman Estates, IL (US); Aparna Pandey, Chicago, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 679 days.

(21) Appl. No.: 12/980,222

(22) Filed: Dec. 28, 2010

(65) Prior Publication Data
US 2012/0163204 A1  Jun. 28, 2012

(51) Int. Cl.
| | | |
|---|---|---|
| H04L 12/16 | (2006.01) | |
| H04W 76/00 | (2009.01) | |
| H04W 4/10 | (2009.01) | |
| H04W 76/02 | (2009.01) | |
| H04L 29/06 | (2006.01) | |

(52) U.S. Cl.
CPC ............. *H04W 76/005* (2013.01); *H04W 4/10* (2013.01); *H04W 76/021* (2013.01); *H04L 65/4061* (2013.01)
USPC ........... 370/261; 370/329; 370/330; 370/276; 370/296; 370/297; 455/416

(58) Field of Classification Search
None
See application file for complete search history.

(56) References Cited

U.S. PATENT DOCUMENTS

| | | | |
|---|---|---|---|
| 5,778,320 A | 7/1998 | Drozt et al. | |
| 7,813,327 B2* | 10/2010 | LoGalbo et al. | 370/338 |
| 2002/0040411 A1* | 4/2002 | Iwatani et al. | 710/2 |
| 2002/0080745 A1* | 6/2002 | Dick et al. | 370/335 |
| 2006/0008078 A1* | 1/2006 | El-Fishawy | 379/432 |
| 2006/0056440 A1* | 3/2006 | Khartabil | 370/447 |
| 2006/0083244 A1* | 4/2006 | Jagadesan et al. | 370/395.2 |
| 2006/0126635 A1 | 6/2006 | Alberth, Jr. et al. | |
| 2006/0155839 A1* | 7/2006 | Hundscheidt et al. | 709/224 |
| 2007/0002821 A1* | 1/2007 | Carlson et al. | 370/349 |
| 2007/0037596 A1* | 2/2007 | Shaffer et al. | 455/518 |
| 2007/0049314 A1* | 3/2007 | Balachandran et al. | 455/518 |
| 2007/0115961 A1* | 5/2007 | Dorenbosch et al. | 370/389 |
| 2007/0165595 A1 | 7/2007 | Xu et al. | |
| 2007/0226310 A1* | 9/2007 | Shaffer et al. | 709/207 |
| 2007/0274460 A1* | 11/2007 | Shaffer et al. | 379/37 |
| 2008/0043744 A1* | 2/2008 | Keller et al. | 370/395.2 |
| 2008/0051124 A1* | 2/2008 | Shaffer et al. | 455/518 |

(Continued)

OTHER PUBLICATIONS

PCT International Search Report for Application No. PCT/US2011/066697 dated Mar. 30, 2012.

*Primary Examiner* — Ian N Moore
*Assistant Examiner* — Dung B Huynh
(74) *Attorney, Agent, or Firm* — Steven A. May

(57) ABSTRACT

A method for reducing set-up signaling in a Long Term Evolution (LTE) communication system is performed by an LTE subsystem. The method includes the LTE subsystem: receiving from a first user equipment (UE) a first message as part of a connection procedure to connect the first UE to the LTE system, the first message having contents that include an identifier for identifying a virtual channel on which the first UE intends to transmit media; determining a status of the virtual channel; and based on the status of the virtual channel, determining whether to send to the first UE a response to the first message that allows the connection procedure to proceed or to send to the first UE a response that terminates the connection procedure.

18 Claims, 3 Drawing Sheets

(56) References Cited

U.S. PATENT DOCUMENTS

| | | | |
|---|---|---|---|
| 2008/0114600 A1* | 5/2008 | Shaffer et al. | 704/270 |
| 2008/0125156 A1* | 5/2008 | Matsui et al. | 455/518 |
| 2008/0159128 A1* | 7/2008 | Shaffer et al. | 370/229 |
| 2008/0159177 A1* | 7/2008 | Balachandran et al. | 370/260 |
| 2009/0109994 A1* | 4/2009 | Bekiares et al. | 370/462 |
| 2009/0144441 A1* | 6/2009 | LoGalbo et al. | 709/235 |
| 2009/0276214 A1* | 11/2009 | Chong et al. | 704/235 |
| 2010/0031265 A1* | 2/2010 | Koning et al. | 718/104 |
| 2010/0080186 A1* | 4/2010 | Guo et al. | 370/329 |
| 2010/0195579 A1* | 8/2010 | Park et al. | 370/329 |
| 2010/0257461 A1* | 10/2010 | Brewer et al. | 715/755 |
| 2011/0090857 A1* | 4/2011 | Guo | 370/329 |
| 2011/0136473 A1* | 6/2011 | Gupta et al. | 455/411 |
| 2011/0263288 A1* | 10/2011 | Korus et al. | 455/518 |
| 2011/0305188 A1* | 12/2011 | Bouwers | 370/315 |
| 2012/0069737 A1* | 3/2012 | Vikberg et al. | 370/232 |
| 2012/0082105 A1* | 4/2012 | Hwang et al. | 370/329 |
| 2012/0302196 A1* | 11/2012 | Chin et al. | 455/404.1 |
| 2013/0283330 A1* | 10/2013 | Hengeveld | 725/116 |

* cited by examiner

METHODS FOR REDUCING SET-UP SIGNALING IN A LONG TERM EVOLUTION SYSTEM

TECHNICAL FIELD

The technical field relates generally to communication systems and more particularly to methods for reducing set-up signaling in a Long Term Evolution communication system.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010.

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®.

Many major carriers in the United States (US) and several worldwide carriers have started to convert their networks to LTE. However, there are some areas in which optimization would lead to a better user experience in LTE systems. One such area is with respect to the amount of signaling used to connect to the LTE system and to arbitrate the floor for media transmissions.

More particularly, at the end of a talk spurt by a user, several other users (e.g., of a talkgroup) may key a Push-to-Talk (PTT) button on their respective user equipment (UE) at roughly the same time to respond to the talk burst, thereby, moving their UE from an idle state to a connected state. To obtain the floor for media transmission, all UE wanting the floor request it explicitly on a signaling channel; and the UE receiving a grant is allocated a dedicated voice bearer for its media transmission to the other UE. Alternatively, all UE wanting the floor speculatively establish dedicated voice bearers and start transmitting on them, with the transmission itself acting as an implicit floor request. The UE whose floor requests are rejected tear down the established voice bearers. However, regardless of how floor control is carried out, the connected UE stay connected for some time (e.g. up to 10 s), including those that do not have dedicated bearers.

There are several problems with the above approaches. First, unless the UE explicitly prevents it, the connection request may start during the talk spurt of another user and use up resources, although the floor grant would likely fail. Moreover, the instantaneous signaling to establish connection and to set up and tear down voice bearers leads to temporary (wasteful) congestion, which can affect other users' attempts to connect to the system. In addition, the UE that attempted and failed to get the floor, will linger in connected state for approximately ten additional seconds, which can be very wasteful and create even more signaling, for example, if the UE need to hand over to neighboring cells during that time. Also, the UE that attempted and failed to get the floor effectively prevent other UE (which are in idle state) from getting the floor on a new keying of the PTT button because the already connected UE are able to send their floor request ahead of the idle ones. This all can affect the users' perception of the service and can create behaviors that favor extraneous, early keying, which in itself make things worse by placing even more UE in connected state.

Thus, there exists a need for methods of reducing set-up and floor control signaling in an LTE system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
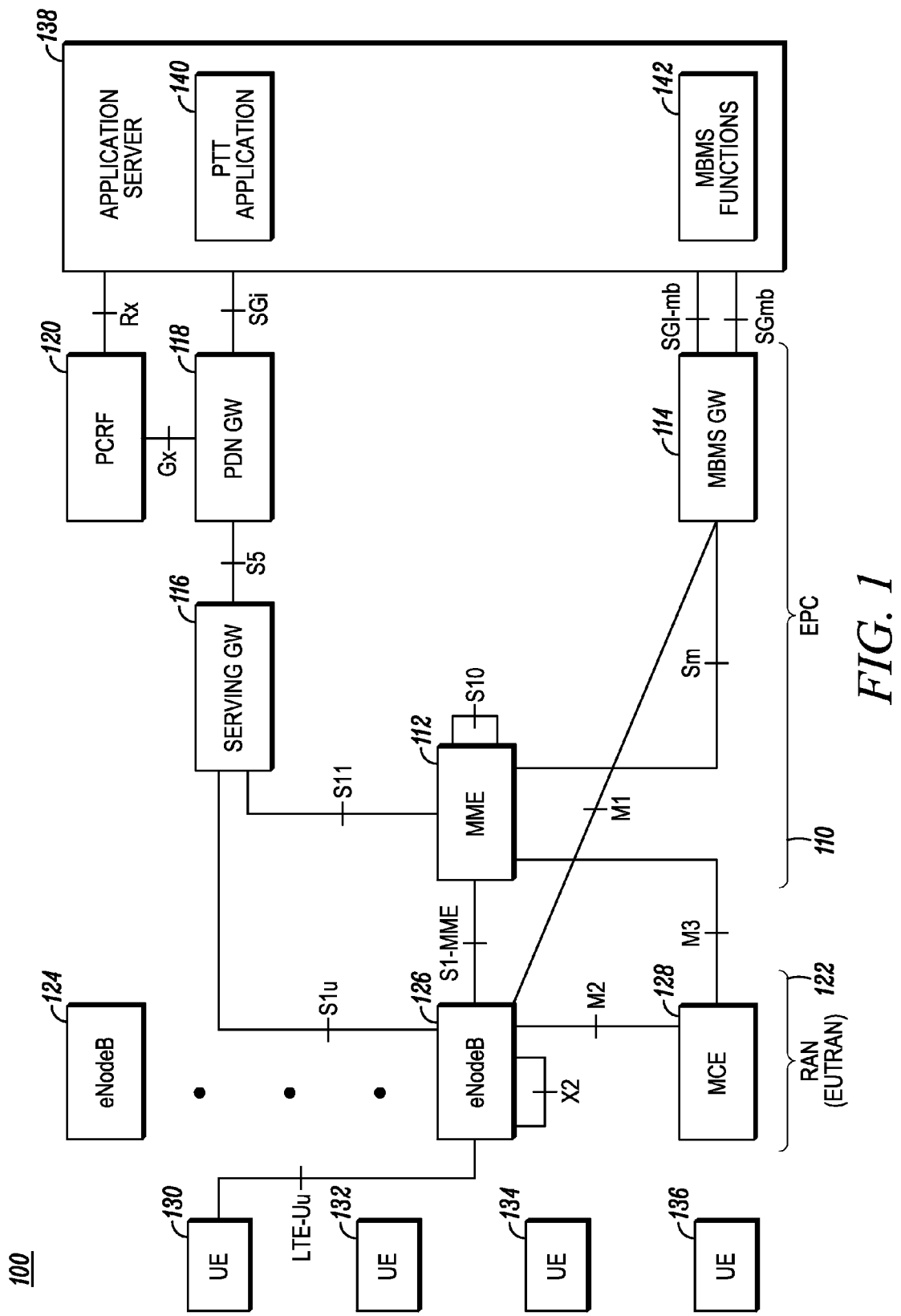
FIG. 1 is a system diagram of a communication system that implements methods for selecting a target cell for handover of UE in an LTE system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, an LTE subsystem: receives from a first user equipment (UE) a first message as part of a connection procedure to connect the first UE to the LTE system, the first message having contents that include an identifier for identifying a virtual channel on which the first UE intends to transmit media; determines a status of the virtual channel; and based on the status of the virtual channel, determines whether to send to the first UE a response to the first message that allows the connection procedure to proceed or to send to the first UE a response that terminates the connection procedure.

Further in accordance with the present teachings, a UE: sends, to a serving cell, a first message as part of a connection procedure to connect the UE to the LTE system, the first message identifying a virtual channel on which the UE intends to transmit media; and receives, from the serving cell, a response to the first message that allows the connection procedure to proceed when a status of the virtual channel is determined to be free, otherwise receiving, from the serving cell, a response to first message that terminates the connection procedure.

Using the various teachings herein, some advantages include: a reduction in the amount of signaling involved at the UE and the eNodeB by preventing some of the LTE connection and the floor control signaling when a virtual channel for which UE want access is unavailable; the eNodeB sending explicit connection releases to UE that connected in order to obtain the floor but failed to do so or performing controlled deferment of a request for floor control from already connected UE to facilitate an equal chance by idle UE to obtain the floor; and an equal chance of connection to all UE that key the PTT button at the same time. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes system elements of: an LTE Evolved Packet Core (EPC) 110 having a number of logical elements (including a Mobility Management Entity (MME) 112, a Multimedia Broadcast Multicast Service Gateway (MBMS GW) 114, a Serving Gateway (SGW) 116, a Packet Data Network Gateway (PDN GW) 118, and a Policy and Charging Rules Function (PCRF) 120); an access network (in this case a radio access network (RAN)) 122 that includes a plurality of eNodeB (LTE base station) infrastructure devices 124 and 126 and a Multicast Control Entity (MCE) 128; a plurality of UE 130, 132, 134, and 136; and an application server (AS) 138 shown, for illustration and not as a limiting factor, as having logical entities of a Push-to-Talk application 140 and MBMS functions 142. In general, the EPC and the RAN are referred to collectively as the LTE system. The elements of communication system 100 and the interfaces between them are further described below.

The RAN 122 elements, EPC 110 elements, application server 138, and UE 130 to 136 implement protocols and signaling in accordance with 3GPP TSs; and the terms LTE communication system, LTE system, and Evolved Packet System (EPS) are used interchangeably herein and are each defined as being inclusive of the RAN 122 and the EPC 110 but not inclusive of the application server 138 or the UE. By contrast, the application server 138 is included in a network of a service provider for the UE, and communications between the application server 138 and the UE are facilitated using the LTE system. Moreover, only a limited number of EPC elements and UE, and one application server and RAN are shown in the diagram, but more such elements may be included in an actual commercial or private system implementation; and only one UE is shown connected to an eNodeB, and one eNodeB is shown connected to the EPC for ease of illustration. Also, the RAN can be any type of access network, including any 2G, e.g., GSM, or 3G, e.g., UMTS, access network.

In general, the UE, the application server 138, the EPC 110 logical elements, and the RAN 122 elements are each implemented using (although not shown) a memory, one or more network interfaces, and a processing device that are operatively coupled, and which when programmed form the means for these system elements to implement their desired functionality, for example as illustrated by reference to the methods and diagram shown in FIG. 2 to FIG. 4. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the application server 138, the EPC 110 logical elements, and the RAN 122 elements may be programmed with software or firmware logic or code for performing functionality described by reference to FIG. 2 to FIG. 4; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods and diagram illustrated in FIG. 2 to FIG. 4. The UE 130, 132, 134, and 136, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as consumers) or private users (such as public safety users).

When a UE attaches to the LTE system, via the RAN, it is connected to the appropriate core network (i.e., MME, SGW, and PDN GW) based on an identity of a service provider sent by the UE. Mobility management for UE is classified based on the radio technologies of source (i.e., serving) and candidate or target LTE cells and the mobility-state of the UE, wherein a cell is defined as being inclusive of a single eNodeB's coverage area or a portion of an eNodeB's coverage area and can be identified by a cell identifier. Pursuant to this understanding of the relationship between cells and eNodeBs, within this text, the terms "cell" and "eNodeB" may be used on occasion interchangeably, without loss of clarity. In addition, the abbreviation eNB may be used in lieu of eNodeB.

From a mobility perspective, the UE can be in one of three states, DETACHED, IDLE, and ACTIVE. The DETACHED state is defined as a transitory state in which the UE is powered-on but is in the process of searching for and registering with the LTE system.

The ACTIVE state is defined as a state in which the UE is registered with the LTE system and has an RRC (radio resource control) connection with an eNodeB or cell. Thus, a UE is deemed to have an "LTE connection" when the UE is in an ACTIVE state and has an RRC connection with a cell, and when the UE to MME signaling connection has been established. In this ACTIVE state, the LTE system knows the cell to which the UE belongs and can receive/transmit data to and from the UE over bearer resources dedicated to the UE. Also, in the ACTIVE state, when a UE moves between two LTE cells, "backward" handover or predictive handover is carried out. In this type of handover, the serving cell, based on RF measurement reports from the UE, determines a target cell and queries the target cell if it has enough bearer resources to accommodate the UE. The target cell also prepares bearer resources before the serving cell commands the UE to handover to the target cell. In an LTE system, it is the responsibility of the current (or serving) cell to instruct the UE to send RF measurement reports and based on these reports, to prepare a target cell to accept the UE, and finally to hand the UE over to the target cell.

Accordingly, as the terms are used herein, a handover is defined as a transition of a UE's LTE connection from a serving cell to a target cell, or a movement of a UE from one cell to a target cell to establish an LTE connection. A serving cell is defined as a cell to which a UE has a current LTE connection. A candidate cell is defined as a potential target cell for handover of the UE. A target cell is the actual cell selected for handover of a given UE. A neighboring cell is a cell having an adjacent geographic coverage area to a UE's serving cell.

The IDLE state is defined as a power-conservation state for the UE, where the UE is not transmitting or receiving packets on a dedicated or default bearer but can receive MBMS service. In the IDLE state, no context about the UE is stored in the eNodeB, and the location of the UE is only known at the MME and only at the granularity of a tracking area (TA) that may include multiple eNodeBs. The MME knows the TA in which the UE last registered, and paging is necessary to locate the UE to a cell.

The application server 138 is an infrastructure device that supports applications (executed in a processing device) or provision of services to UE over the LTE system. Such applications include, but are not limited to, PTT services, PTV (Push-to-Video) services, PTX (push-to-anything) services via unicast or multicast. The multicast can be delivered through an EPS by way of unicast service or MBMS Service. In an embodiment, the application server 138 is an infrastructure element of a Public Land Mobile Network (PLMN) of a public safety agency to which the UE have access. As such, the application server may be, for instance, a computer aided dispatch (CAD) server, a media server, a call controller, etc. As illustrated, the application server 138 could include the PTT application 140 and, if broadcast/multicast is used for delivery, the MBMS functions 142. The PTT application 140 facilitates media delivery to the UE that have PTT capabilities. The MBMS functions 142, which are typically associated with a Broadcast-Multicast Service Center (BM-SC), manage MBMS services to the UE and are the source of MBMS traffic. The MBMS functions 142 include, for example, authorization for terminals requesting to activate a MBMS service, scheduling of broadcast and multicast services, integrity and confidentiality protection of MBMS data, MBMS session announcement, and serving as an entry point for content providers or any other broadcast/multicast source that is external to the LTE system. Moreover, although MBMS point-to-multipoint (PTM) functions 142 are illustratively shown, the application server 138 can, alternatively, be configured with any suitable PTM (e.g., broadcast and/or multicast) capabilities.

The EPC 110 is an all-IP core network that provides mobile core functionality that, in previous mobile generations (2G, 3G), has been realized through two separate sub-domains: circuit-switched (CS) for voice and packet-switched (PS) for data. The EPC 110 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 110 comprises the logical components of the MME 112, the MBMS GW 114, the SGW 116, the PDN GW 118, and the PCRF 120 and further comprises the, respective, interfaces (also referred to in the art as reference points) between these logical entities. The logical entities of the EPC 110 are shown as separate logical blocks and indeed can, in some embodiments, each be included in separate hardware devices or can, alternatively, be combined in one or more hardware devices. Also, the EPC 110, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 110 are not shown in FIG. 1 for the sake of clarity.

Turning first to the MME 112, this EPC element is the key control-node for UE access on the LTE system. It is responsible for IDLE mode UE tracking and paging procedures, including retransmissions. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown). Non-Access Stratum (NAS) signaling generated using a NAS protocol terminates at the MME 112, and the MME 112 is also responsible for generation and allocation of temporary identities or identifiers to UE. The MME 112 further checks the authorization of the UE to camp on the service provider's PLMN and enforces UE roaming restrictions.

In the control-plane, the NAS protocol, which runs between the MME 112 and the UE, is used for control-purposes such as network attach, authentication, setting up of bearers, and mobility management. Unlike in other systems, in LTE the allocation and maintenance of bearers is independent of the connection state of the UE, in the sense that a UE may be connected and not have bearers allocated to it and conversely, a UE may be idle but have allocated bearers.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic.

A bearer can be point-to-point (PTP) (such as a unicast bearer), or a PTM bearer (such as a MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 114 is an entry point in the LTE system, and it distributes MBMS traffic to all eNodeBs within MBMS service areas. MBMS may use Single Frequency Network (SFN) transmission, also referred to as MBSFN. In MBSFN, the transmission happens from a time-synchronized set of eNodeBs in the service area, using the same resource blocks. IP multicast can be used for distributing the traffic from the MBMS GW 114 to the different eNodeBs. The MCE 128 in the RAN 122 ensures that the same resource blocks are allocated for a given service across all the eNodeBs of a given MBSFN area. It is the task of the MCE 128 to ensure that RLC (Radio Link Control)/MAC (Media Access Control) layers at the eNodeBs are appropriately configured for MBSFN operation.

The SGW 116 routes and forwards user point-to-point data packets, while also acting as the mobility anchor for the user plane during inter-eNodeB handovers and as the anchor for mobility between LTE and other 3GPP technologies.

The PDN GW 118 provides connectivity to the UE to external packet data networks (PDNs) by being the point of exit and entry of traffic for the UE. A UE may have simultaneous connectivity with more than one PDN GW for accessing multiple PDNs. The PDN GW 118 performs policy enforcement, packet filtering for each user, charging support, lawful interception and packet screening. Another key role of the PDN GW 118 is to act as the anchor for mobility between 3 GPP and non-3GPP technologies such as WiMAX and 3GPP2 (CDMA 1X and EvDO). The PCRF 120 provides policy and charging rules to the PDN GW to support its SDF detection, policy enforcement, and flow-based charging functions.

RAN 122 in this embodiment is a E-UTRAN (Evolved UMTS Terrestrial Radio Access Network) comprising multiple cells each served by an eNodeB, e.g., 124, 126, which serve as the intermediate infrastructure device between the UE and the EPC 110 and a point of access for the UE to allocated bearers. Each cell represents a geographic coverage area that provides the wireless resources termed herein as bearers for carrying data (or SDFs) for UE connected to the RAN. An RRC layer in the eNodeB makes handover decisions based on neighbor cell RF measurement reports sent by the UE, pages for the UE over the air, broadcasts system information, controls UE RF measurement reporting such as the periodicity of Channel Quality Information (CQI) reports, and allocates cell-level temporary identifiers to active UE. The RRC layer also executes transfer of UE context from the serving cell to the target cell during handover, and does integrity protection of RRC messages. In addition, the RRC layer is responsible for the setting up and maintenance of EPS bearer resources.

Regarding the LTE reference points, the UE communicates its signaling with an eNodeB via an LTE-Uu reference point. An S1-MME reference point is used for the control plane protocol (e.g., eRANAP which uses Stream Control Transmission Protocol (SCTP) as the transport protocol) between the E-UTRAN (e.g., via the eNodeB 126) and the MME 112. An S1$u$ reference point between the eNodeB 126 (E-UTRAN) and the SGW 116 is used for the per-bearer user plane tunneling and inter-eNodeB path switching during handover, wherein the transport protocol over this interface is GPRS Tunneling Protocol-User plane (GTP-U). An X2 reference point is used for inter-eNodeB communications.

An S5 reference point provides user plane tunneling and tunnel management between the SGW 116 and the PDN GW 118 and is used for SGW relocation due to UE mobility and if the SGW needs to connect to a non-collocated PDN GW for the required PDN connectivity. Both GTP and IETF (Internet Engineering Task Force) based Mobile IP protocols are used over this interface.

A Gx reference point provides transfer of QoS policy and charging rules from the PCRF 120 to a Policy and Charging Enforcement Function (PCEF, not shown) in the PDN GW 118. An Rx reference point resides between the PCRF 120 and an Application Function (AF, not shown) in the application server 138 for control signaling. An S10 reference point resides between MMEs for MME relocation and MME to MME information transfer. An S11 reference point resides between the MME 112 and SGW 116 for corresponding signaling.

An SGi reference point resides between the PDN GW 118 and a packet data network (in this case a PDN that includes the application server 138), such as an operator-external public or private PDN or an intra-operator PDN, e.g., for provision of IMS services. The SGi reference point corresponds to a Gi reference point for 2G/3G accesses.

For supporting the PTM signaling provided by MBMS (in this illustrative embodiment), an SG-mb reference point between the MBMS GW 114 and the application server 138 supports MBMS bearer signaling for setting up and releasing context at MBMS session establishment and termination and also may support user related signaling, e.g. for Multicast session authorization, or user session joining or detach. An SGi-mb reference point between the MBMS GW 114 and the application server 138 supports the MBMS traffic plane. An M1 reference point between the MBMS GW 114 and the eNodeB 126 makes use of an IP multicast protocol for the delivery of packets to eNodeBs. The traffic plane "payload" is encapsulated in SYNC protocol data units (PDUs). An M2 reference point between the eNodeB 126 and the MCE 128 is used by the MCE 128 to provide the eNodeB with radio configuration data. An M3 reference point between the MME 112 and the MCE 128 supports the MBMS session control signaling, e.g. for session initiation and termination. An Sm reference point provides for communications between the MBMS GW 114 and the MME 112 to support the PTM services.

A PTM bearer is generally associated with a service and is identified via a Temporary Mobile Group Identity (TMGI). Between the eNodeB and the UE, the PTM bearer takes the form of a Multicast Traffic Channel (MTCH), with the traffic associated to a specific TMGI being carried by a specific MTCH at any given time. Within a MBSFN area, several MTCHs being transmitted with the same modulation and coding levels can be grouped in one MCH transport channel.

Common signaling is carried out at both the RRC layer (e.g. the MTCH control channel) and at the MAC layer.

As used herein, the term virtual channel (VC) means an identifiable information flow between a media source and a set of target UE associated with the virtual channel. In general, it is possible to have several virtual channels active at the same time in a service area. A virtual channel can be seen as a logical representative of a communication service and/or the group of users to which the information flow is addressed, e.g., a talkgroup, and can thus be referenced or indicated by an identifier for the group such as a talkgroup identifier. To receive the desired content, the UE identifies and decodes a downlink bearer to which the virtual channel is mapped. If one or more MBMS PTM bearers are used for a virtual channel, each bearer may consist of an MTCH and the associated portions of the RAN and of the EPC bearers that traverse the SGi-mb and M1 interfaces. A UE can be a content source for a virtual channel by using an uplink bearer associated with (or mapped to or for) a virtual channel to send media to an application server; or the UE can receive content on a virtual channel over a unicast PTP or broadcast PTM downlink bearer for the virtual channel.

Figure 2:
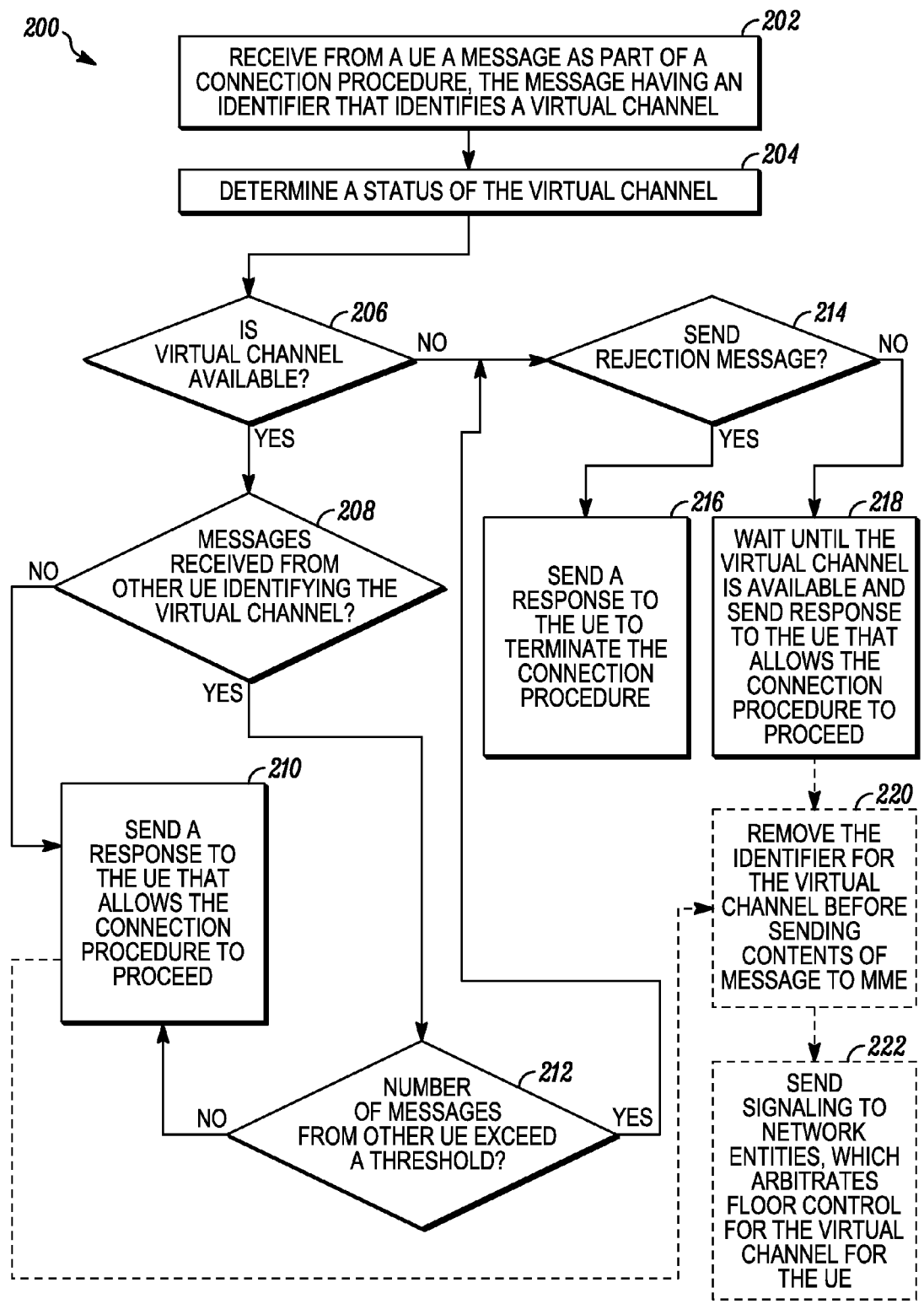
FIG. 2 is a flow diagram illustrating a method performed by an LTE subsystem for reducing set-up signaling in accordance with some embodiments.
Figure 3:
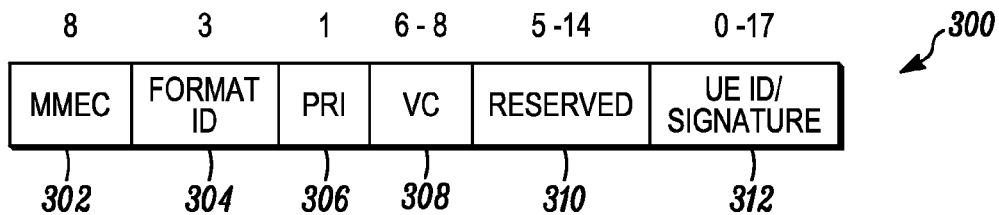
FIG. 3 is a block diagram illustrating an S-TMSI field having identifiers that facilitate implementing the methods for reducing set-up time for communications among multiple user equipment in accordance with some embodiments.

Turning now to FIG. 2, a flow diagram illustrating a method for reducing set-up time signaling in an LTE system is shown and generally indicated at 200. The functionality illustrated by method 200 is performed in an LTE subsystem, wherein an LTE subsystem is defined as a subset (less than all) of the elements of the LTE system. In this illustrative embodiment, the LTE subsystem that performs method 200 includes an eNodeB (i.e., a serving cell) and a serving MME; although the functionality described by reference to method 200 can be placed entirely in the eNodeB in at least one implementation. However, at least some of the functionality in accordance with method 200 could, alternatively, be placed in other network elements including, but not limited to a PDN GW, a PCRF, etc.

Initially, the method 200 will be described in terms of the eNodeB being the sole entity within the LTE subsystem performing the functionality, for ease of understanding. Additional description will address the implementation of method 200 when the LTE subsystem includes both the eNodeB and the MME performing functionality. In accordance with method 200 (as performed solely by the eNodeB), the eNodeB receives (202), from a UE, a message that is part of a connection procedure used to connect the UE to the LTE system. The UE is associated with a virtual channel that is mapped to one or more downlink bearers, wherein "associated" with the virtual channel means that the UE has the necessary information and authorization to identify and decode the virtual channel or to transmit on the virtual channel. The message received from the UE at 202 identifies the virtual channel on which the UE intends to transmit. For example, the message includes an identifier that identifies the virtual channel. The identifier can be any suitable identifier, and where the virtual channel corresponds to a talkgroup or other communication group, the identifier can include a talkgroup or other communication group identifier.

In one illustrative implementation, the identifier for the virtual channel is mapped to an MME identifier such that the identifier identifies not only the virtual channel but also the serving or current MME for the UE. In one example implementation, the virtual channel is mapped to an eight bit MME code (i.e., a 3GPP MMEC). Alternatively, the mapping of virtual channels to MME identifiers is extended beyond the eight bit MME code into a fourteen bit MME group identifier (i.e., a 3GPP MMEGI). To further this implementation, the UE and the eNodeBs are provisioned with the mapping of virtual channels to MME identifiers; with the UE inserting the virtual channel identifier into its message to the eNodeB, and the eNodeB processing the identifier.

As used herein the term mapped (or its equivalents "maps", "mapping", etc.), in that one item or piece of information is mapped to another item or piece of information, means that the mapping associates one identifier or indicator (indication) to multiple pieces of information and that a translation can be performed to generate the multiple pieces of information from the one identifier or indicator. For example, where an identifier maps the virtual channel to a MMEC, the identifier is associated with and provides information about both a virtual channel identifier and the MME that can be obtained through a translation technique such as consulting a table that has been provisioned in a device. Conversely, where the multiple pieces of information are known, the table can be consulted to obtain the identifier that associates those multiple pieces of information.

Also the term media transmission, as used herein, means messaging having media (e.g., voice, data, video, etc.) as its contents or payload. In some illustrative implementations, the UE can become associated with a virtual channel by choosing the virtual channel from an address book, a position of a channel selector knob/switch, a default setting, etc. As mentioned above, in one example implementation, a table of virtual channels-to-MMECs is preloaded into the UE (thus the UE will associate to a virtual channel by referencing the mapping between the virtual channel and MMECs); and this mapping can be tied to a selector knob/switch position on the UE for instance. In another implementation, a table of virtual channels-to-TMGIs is preloaded into the UE (thus the UE will associate to a virtual channel by referencing the mapping between the virtual channel and TMGIs); and this mapping can be tied to the selector knob/switch position on the UE.

The message received from the UE at 202 can be any suitable message. In one example implementation the identifier for the virtual channel is included in one or more current fields or subfields of a 3GPP RRCConnectionRequest message or can be included by one or more added or extended fields in the message. For instance, the identifier is included in content of the message such as in an S-TMSI (S-Temporary Mobile Subscriber Identity) field in the RRCConnectionRequest message, wherein the S-TMSI field also identifies the UE. In another example implementation the identifier for the virtual channel is included in one or more current fields or subfields of a 3GPP RRCConnectionSetupComplete message or can be included by one or more added or extended fields in the message. For instance, the identifier is included in contents of the message such as in a MMEI (Mobility Management Entity Identifier) subfield of a GUMMEI (Globally Unique MMEI) field in the RRCConnectionSetupComplete message, wherein the MMEI subfield of the GUMMEI field is associated with the UE.

As mentioned above, the request to connect can be an RRCConnectionRequest message, which has a format that is compatible with the 3GPP TSs and is used to request connection to the LTE system when the UE is in an IDLE state. The request includes an identifier for the UE and contents that identify the virtual channel with which the UE is associated, e.g., a virtual channel identifier represented as a bit string. For instance, the TMGI, as described above, or a portion of the TMGI can serve to identify the virtual channel or a MME identifier can serve as an identifier of the virtual channel. More particularly, a TMGI includes three fields: a MNC=Mobile Network Code (carrier id); a MCC=Mobile Country Code (country id), and a MBMS Service ID (24 bits), wherein the MBMS Service ID identifies the virtual channel.

In one illustrative implementation, a set of MBMS Service IDs are defined via network management and are mapped to virtual channels; and the mappings are loaded into the UE. Moreover, a VC identifier having a smaller number of bits than the MBMS Service ID can be included in the RRCConnectionRequest message; and that VC identifier is translated to the corresponding MBMS Service ID, which identifies the virtual channel.

In one embodiment, the UE includes the UE identifier and the virtual channel identifier in an existing field of the RRCConnectionRequest message, such as in an S-TMSI field. FIG. 3 illustrates an S-TMSI field 300 formatted to include a UE identifier and a virtual channel identifier in accordance with at least one implementation of the present disclosure. The S-TMSI field 300 includes an 8-bit MMEC (MME Code) field 302 and an adjacent 32-bit M-TMSI field. When the UE 406 first attaches to the eNodeB, the eNodeB selects a serving MME for the UE, and the MMEC is the unique identifier for the selected MME. Upon the UE reconnecting to the LTE (after being in an IDLE state), the eNodeB uses the MMEC to route signaling to the proper MME. The MME allocates the M-TMSI to the UE, wherein the M-TMSI has a structure or format that allows the UE 406 to include the VC identifier in the M-TMSI for enabling methods according to the present disclosure.

In this illustrative implementation, the M-TMSI includes a 3-bit FORMAT ID field 304, a 1-bit PRI field 306, a 6 to 8-bit VC field 308, a 5 to 14-bit reserved field 310, and a 0-17 bit UE ID/Signature field 312. When the MME generates the M-TMSI, only the UE ID field is populated, while the other bits are set to 0. When bits of value other than 0 are received in the FORMAT ID field, the fields other than just the UE ID are interpreted as meaningful. The PRI field 306 indicates whether the user of the UE is a regular user or is a priority user. The VC field 308 contains the virtual channel identifier. In this example the VC field has a length of only 6-8 bits, but it can be easily extended by appropriating bits from the adjacent RESERVED field.

Field 310 is reserved for future use, and may be used for example, for accommodating more UE or for defining new formats. Field 312 contains, depending on the FORMAT ID, the UE identifier and/or an encrypted signature (e.g., a digital certificate generated using a Public Key Infrastructure (PKI) infrastructure) for early validation of the requestor for the LTE connection. It should be noted that FIG. 3 provides one example of how the UE and VC identifiers can be included in existing messaging between the UE and the LTE system. However, alternative ways of incorporating these identifiers into existing messaging or the use of proprietary messaging that includes the VC and/or UE identifier is contemplated within the scope of the present disclosure. For example, the MMEC field 302 could contain a value that translates to an identifier for the virtual channel and the VC field 308 could contain a talkgroup identifier.

The RRCConnectionSetupComplete message includes a GUMMEI which has a MCC subfield, a MNC subfield, a MMEI subfield that includes an MMEGI (Mobility Management Entity Group Identifier) subfield and a MMEC subfield, wherein the identifier for the virtual channel (e.g., the MMEC, etc.) could be inserted into the MMEI subfield of the GUMMEI. The RRCConnectionSetupComplete further included an S-TMSI, similar to that included in the RRCConnectionRequest message, into which the identifier for the virtual channel could be inserted, for instance as described above.

In alternative embodiments, any control plane messaging from the UE to the eNodeB could be used to transport the identifier that identifies the virtual channel including, but not limited to, RRC messages for dedicated bearer setup, Non-Access Stratum messages involving Service Request, etc., with appropriate fields to include the virtual channel (e.g., talkgroup) identifier. In addition, instead of the UE explicitly signaling the relevant virtual channel, in alternate embodiments this information could be implicit. In particular, the LTE subsystem has prior information about both the given virtual channel and the time when the given virtual channel is available or frees up to offer opportunities for other potential speakers.

In a further embodiment, the message from the UE (at 202) that is part of the connection procedure also includes an indication of one or more Quality of Service (QoS) parameters or access parameters for the UE's intended transmission on the virtual channel. These parameters include, but are not limited to, priority, queuing, and right of pre-emption. The parameters can be included in the message from the UE in any suitable way such as by the indication of such parameters being "encoded" into or mapped to the same identifier that maps the virtual channel to the MME identifier. Alternatively, the UE inserts an indication of such parameters, for instance, by inserting the indications as one or more separate values in the message. Moreover, in one embodiment the indication of the one or more QoS or access parameters (regardless of the particular format used for such indications) can further map to 3GPP QoS parameters such as QoS Class Identifier (QCI), which reference access-node specific parameters that control packet forwarding treatment such scheduling weights, admission thresholds, queue management thresholds, etc., and Allocation and Retention Priority (ARP), which contains information about priority level, pre-emption capability, and pre-emption vulnerability.

Returning again to method 200, upon receiving the message from the UE at 202, the eNodeB processes the identifier (e.g., using a stored table or other mechanism) to determine the particular virtual channel and then determines (204) a status of the virtual channel, wherein status means whether the virtual channel is available (free) for a transmission or unavailable (busy) with another transmission. For example, an application server network entity that will forward the transmission from the UE to other listeners, receivers, or members of the virtual channel typically has knowledge of the status of the virtual channel and can provide this status information to the LTE subsystem using, for instance, a flag or value, included in any suitable messaging or signaling. Moreover, other network entities can provide this status information including, but not limited to, other UE, the PCRF, etc.

Upon obtaining the status of the virtual channel, the LTE subsystem determines (206) whether the virtual channel is available. If the virtual channel is available, the LTE subsystem further determines (208) whether it has received any messages from other UE identifying (e.g., via a suitable identifier such as one described above) the same virtual channel for their intended transmissions. If no other such messages have been received, the LTE subsystem sends (210) a response to the UE that allows the connection procedure to proceed. For example, where the message from the UE at 202 is the RRCConnectionRequest message, the response to the UE can be a RRCSetup message. Where the message from the UE is the RRCConnectionComplete message, the response to the UE can be a 3GPP RRCSecurityModeCmd message, a floor grant message, or any other suitable message.

Moreover, in the implementation where the eNodeB but not the MME performs the functionality described by reference to method 200 of the present disclosure, the eNodeB removes (220) the identifier for the virtual channel, determines from the identifier the serving MME and forwards at least a portion of the contents of the UE's message to the serving MME. For instance, where the UE's message comprises a RRCConnectionRequest message, the eNodeB's message to the MME comprises a 3GPP S1AP initial UE message containing the S-TMSI (without the virtual channel identifier) and a NAS service request from the RRCConnectionRequest. Moreover, the LTE subsystem can optionally send (222) signaling to one or more network entities (e.g., the application server) that arbitrates floor control for the virtual channel for the UE. In one illustrative example, the eNodeB proxies a floor request to the application server on behalf of the UE to further reduce call set-up time for the UE's transmission.

More particularly, the LTE subsystem (either the eNodeB or the MME or the two cooperatively) generates, on behalf of the UE, a request to transmit media on the virtual channel and sends the request to transmit to an application server. Stated another way, the UE sending the request for an LTE connection with the UE and VC identifiers triggers the LTE subsystem to generate and send to the application server, on behalf of the UE, the request to transmit on the identified VC. Since the LTE subsystem (and not the UE as is normally done) generates the request to transmit, it is deemed herein as a "proxied" request to transmit. The sending of this proxied request to transmit to the application server triggers the establishment of a call to deliver a media transmission from the UE (that sent the request for an LTE connection) to one or more other UE associated with the identified virtual channel.

When, at 208, the eNodeB has received messages from additional UE requesting use of the virtual channel for transmission (wherein these messages are also sent as part of a connection procedure to connect the additional UE to the LTE system in order to transmit on the virtual channel), the number of messages received (inclusive of the message from the UE at 202 and the messages from additional UE) is compared by the LTE subsystem to a threshold, at 212. If the number of messages is less than the threshold, method 200 transitions to block 210, and the LTE subsystem sends the response to the UE that allows the connection procedure for the UE to proceed. Otherwise, if it is determined (212) that the number of total messages exceeds the threshold, the LTE subsystem determines (214) to which UE to send a rejection message, meaning a message that terminates the connection procedure for the corresponding UE.

Essentially, the LTE subsystem sends the response that allows the connection procedure to proceed to a number of the UE less than the threshold used in 212 and sends the response that terminates the connection procedure to all the other UE. The UE sending the message at 202 may be one of the UE to which the LTE subsystem (216) sends a response that terminates the connection procedure, for instance, by sending an RRCConnectionReject message, which can be sent in response to an RRCConnectionRequest message or an RRCConnectionRelease message, which can be sent in response to an RRCConnectionSetupComplete message. Which UE get which responses can be determined, for instance, based on any QoS and access parameters included in their respective messages. However, at 214, the LTE subsystem can alternatively wait an amount of time (218) until the virtual channel is available and send the response (to the message at 202) to the UE, which allows the connection procedure to proceed for that UE. Where the LTE subsystem includes only the eNodeB, method 200 then transitions to 220, and the LTE subsystem may optionally perform 222. With the exception of block 220 and 202, all of the blocks of the flow diagram in FIG. 2 could, alternatively be performed only by the MME or could be performed by some combination of the eNodeB and the MME.

Figure 4:
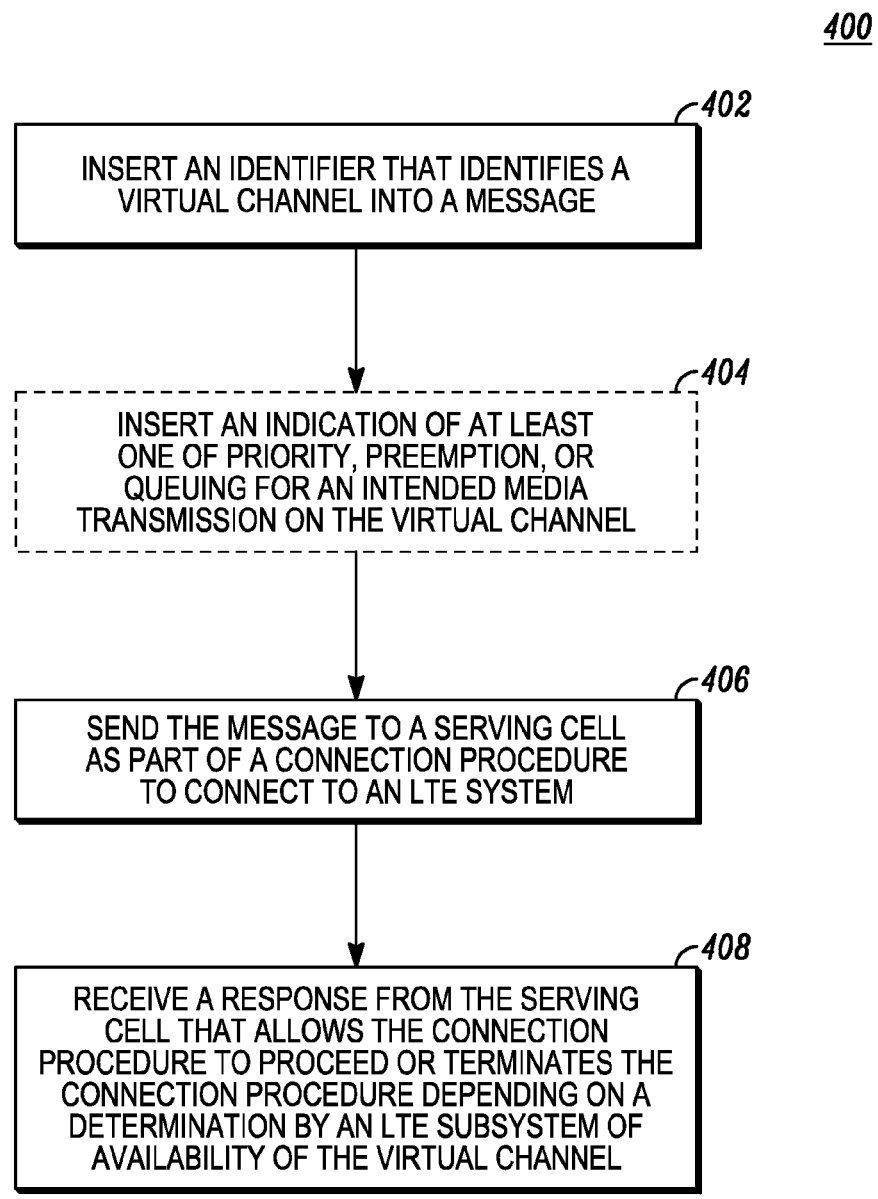
FIG. 4 is a flow diagram illustrating a method performed by a user equipment (UE) for reducing set-up signaling in accordance with some embodiments.

Turning now to FIG. 4, wherein is illustrated a method 400 performed in a UE for reducing set-up signaling in an LTE system. At 402, the UE inserts an identifier that identifies a virtual channel into a message such as a RRCConnectionRequest message or a RRCConnectionComplete message, which is a part of a connection procedure to connect the UE to the LTE system. As described in detail above, the identifier could include, for instance, a MMEC, a TGMI, a talkgroup identifier or some combination. Optionally, the UE also inserts (404) an indication of one or more parameters including, but not limited to, priority, pre-emption, or queuing for an intended media stream transmission by the UE on the virtual channel. The UE sends (406) the message to the eNodeB. In response thereto, the UE receives (408) from the eNodeB either a response that allows the connection procedure to proceed or a response that terminates the connection procedure. The response depends on a determination by a LTE subsystem, which includes the eNodeB and an MME, of the availability of the virtual channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of methods described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for reducing set-up signaling in a Long Term Evolution (LTE) system, the method comprising:
   at an LTE subsystem performing:
   receiving, from each of one or more user equipment (UE), a first message comprising a virtual channel identifier for a virtual channel on which the UE intends to transmit media, wherein the virtual channel is an information flow between a media source and a set of target UE and is associated with a downlink bearer;
   determining whether the virtual channel is available for a transmission;
   comparing a number of first messages received to a threshold;
   when the number of first messages received is less than the threshold and when the virtual channel is available, sending to each of the one or more UE a response to the first message that allows the connection procedure to proceed; and
   when the number of first messages received is greater than the threshold and when the virtual channel is available, sending, to a number of the one or more UE less than the threshold, a response that allows the connection procedure to proceed and sending, to all the other UE that sent the first message, a response that terminates the connection procedure.

2. The method of claim 1, wherein determining whether the virtual channel is available and sending to the first UE the response that allows the connection procedure to proceed or the response that terminates the connection procedure is performed by a Mobility Management Entity.

3. The method of claim 1, wherein determining whether the virtual channel is available and sending to the first UE the response that allows the connection procedure to proceed or the response that terminates the connection procedure is performed by a serving cell.

4. The method of claim 3 further comprising the serving cell removing the identifier that identifies the virtual channel before sending at least a portion of the contents of the first message to a Mobility Management Entity.

5. The method of claim 1, wherein the first message further includes an indication of at least one of priority, pre-emption, or queuing for the intended media transmission by the first UE.

6. The method of claim 1, wherein the first message comprises an RRCConnectionRequest message.

7. The method of claim 6, wherein the first message comprises an S-Temporary Mobile Subscriber Identity (S-TMSI) field that identifies the UE, wherein the S-TMSI field includes the virtual channel identifier.

8. The method of claim 1, wherein the first message comprises an RRCConnectionSetupComplete message that includes the virtual channel identifier.

9. The method of claim 8, wherein the first message comprises a Mobility Management Entity Identifier (MMEI) subfield of a Globally Unique MMEI (GUMMEI) field associated with the UE, wherein the MMEI subfield includes the virtual channel identifier.

10. The method of claim 1 further comprising the LTE subsystem determining that the virtual channel is currently unavailable and waiting an amount of time for the virtual channel to become available before sending the first UE the response that allows the connection procedure to proceed.

11. The method of claim 1, wherein the first messages are received from each of the one or more UE as part of a connection procedure to connect the UE to the LTE system in order to transmit on the virtual channel.

12. The method of claim 1 further comprising the LTE subsystem receiving, from network entities, signaling that indicates the status of the virtual channel as available or unavailable.

13. The method of claim 1 further comprising the LTE subsystem sending signaling to network entities, which arbitrate floor control for the virtual channel.

14. A method for reducing set-up signaling in a Long Term Evolution (LTE) system, the method comprising:

sending, by each of one or more user equipment (UE) to a serving cell, a first message including a virtual channel identifier for a virtual channel on which the UE intends to transmit media, wherein the virtual channel is an information flow between a media source and a set of target UE and is associated with a downlink bearer;

when a number of the one or more UE is less than a threshold and when the virtual channel is available, receiving, by each of the one or more UE, a response to the first message that allows the connection procedure to proceed; and when the number of the one or more UE is greater than the threshold and when the virtual channel is available, receiving, by a number of the one or more UE less than the threshold, a response that allows the connection procedure to proceed and receiving, by all the other UE that sent the first message, a response that terminates the connection procedure.

15. The method of claim 14 wherein the first messages are sent by each of the one or more UE as part of a connection procedure to connect the UE to the LTE system in order to transmit on the virtual channel.

16. The method of claim 15 wherein the first message further comprises an indication of at least one of priority, preemption, and queuing for the intended media transmission by the UE.

17. The method of claim 15, wherein the first message comprises an RRCConnectionRequest having an S-Temporary Mobile Subscriber Identity (S-TMSI) field that identifies the UE and includes the virtual channel identifier.

18. The method of claim 15, wherein the first message comprises an RRCConnectionSetupComplete having a Globally Unique Mobility Management Entity Identifier (GUMMEI) field that identifies the UE and includes the virtual channel identifier.

* * * * *

UNITED STATES PATENT AND TRADEMARK OFFICE
CERTIFICATE OF CORRECTION

| | | |
|---|---|---|
| PATENT NO. | : 8,787,212 B2 | Page 1 of 1 |
| APPLICATION NO. | : 12/980222 | |
| DATED | : July 22, 2014 | |
| INVENTOR(S) | : Valentin Oprescu-Surcobe et al. | |

It is certified that error appears in the above-identified patent and that said Letters Patent is hereby corrected as shown below:

IN THE SPECIFICATION:

In Column 8, Line 67, delete "MCH" and insert -- MTCH --, therefor.

Signed and Sealed this
Nineteenth Day of April, 2016

Michelle K. Lee
*Director of the United States Patent and Trademark Office*